United States Patent [19]

Gompers

[11] Patent Number: 4,464,859
[45] Date of Patent: Aug. 14, 1984

[54] ANIMAL RECOVERY

[76] Inventor: William J. Gompers, Bridgeville Borough, Allegheney County, Pa. 15017

[21] Appl. No.: 397,523

[22] Filed: Jul. 12, 1982

[51] Int. Cl.³ .......................................... A01M 29/00
[52] U.S. Cl. .......................................... 43/58; 43/61
[58] Field of Search .................. 43/1, 45, 124, 58, 61, 43/60, 80; 116/22 A, 137 A, 147

[56] References Cited

U.S. PATENT DOCUMENTS

| 791,933 | 6/1905 | McEndree | 43/60 |
| 3,412,394 | 11/1968 | Lewis et al. | 116/22 A |
| 3,831,548 | 8/1974 | Droege | 43/17.1 X |
| 3,965,609 | 6/1976 | Jordan | 43/131 |
| 3,991,703 | 11/1976 | Faust et al. | 116/147 |

FOREIGN PATENT DOCUMENTS

| 2352987 | 4/1975 | Fed. Rep. of Germany | 43/17.1 |
| 2825393 | 1/1979 | Fed. Rep. of Germany | 43/124 |

Primary Examiner—Nicholas P. Godici
Assistant Examiner—M. Jordan
Attorney, Agent, or Firm—William L. Krayer

[57] ABSTRACT

Urban wildlife is recovered from chimneys and similar relatively inaccessible locations by placing a cage at a point of egress, maneuvering a sound-making device to a point near the wildlife, preferably on the other side thereof, activating the sound-making device to startle the wildlife, and recovering it in the cage when it flees the noise.

7 Claims, 1 Drawing Figure

U.S. Patent    Aug. 14, 1984    4,464,859
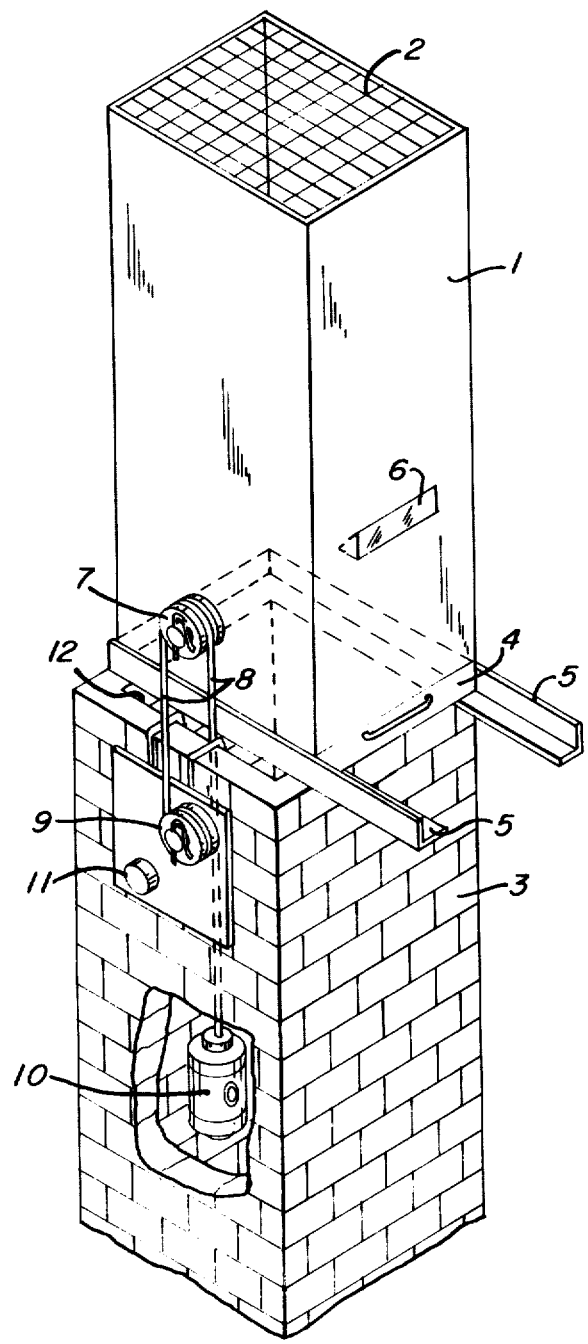

ANIMAL RECOVERY

BACKGROUND OF THE INVENTION

Normally wild or undomesticated animals such as racoons, squirrels, and the like have increasingly adapted in recent years to the encroachment of urban and suburban areas by earning o live in storm sewers and parts of buildings in which humans seldom appear such as under rafters and in chimneys. Animals which take up residence in chimneys are particularly difficult to dislodge. Female raccoons commonly bear their litters and live on ledges far down the chimney hole. Frequently the homeowner is mystified by strange noises difficult to locate; raccoons particularly will attack humans when provoked and can inflict painful and lasting injury.

An effective, safe and humane method of removing animals from chimneys and other relatively inaccessible places has long been needed.

SUMMARY OF THE INVENTION

I have invented a safe, simple and highly effective method and apparatus for removing animals from chimneys. It employs simple portable equipment which may be easily operated from the top of a chimney. The method comprises placing a cage at the opening of the chimney or other inaccessible location, generating a loud noise from a point near or on the opposite side of the animal from the cage, and capturing the animal when he emerges in response to the noise.

The invention will be further described with reference to the accompanying drawing.

In the drawing, a cage 1 preferably having a screen 2 for air is placed on the chimney 3 with its open end down. The open end has a door 4 (shown in the closed position) which slides on runners 5. A prism 6 or other viewing device is placed on the side of the cage 1 so that the animal or animals may be seen without the animal seeing the observer. Viewing is useful to know whether more than one animal is approaching the cage, so the door may be closed at the appropriate time.

An essential part of my invention is a means for generating a loud sound such as siren-like noisemaker 10. Noisemaker 10 is lowered down the chimney with its electrical cord 8 over pulley or wheel 7 emanating from reel 9. The electrical cord obtains its power from battery or "power-pack" 11, and may be conveniently lowered through a space 12 between the chimney 3 and the cage 1. After the noisemaker 10 is lowered (preferably) beyond the point where the animals are, the power-pack 11 is activated by a switch (not shown) to generate noise, startling the animals. Upward progress of the animals may be followed through viewer 6 and, if the animals hesitate, the noisemaker 10 can be raised behind them and may even nudge them.

As soon as all the animals to be seen in the viewer 6 (not infrequently this will mean a mother raccoon and two or more babies) are in the interior of the cage 1, the door 4 is closed and the cage may be removed safely with the animals intact and uninjured. They can then be set free, preferably in an area remote from human habitation.

My method is fast, efficient, safe, and humane, and has resulted in the successful removal of many animals from chimneys.

I claim:

1. Method of capturing an animal residing in a chimney comprising (1) lowering an electrically-operated noisemaker to a point near the animal, (2) activating the noisemaker to startle the animal and cause it to move up the chimney, (3) raising the noisemaker up the chimney behind the animal as it ascends, and (4) capturing the animal at the top of the chimney.

2. Method of claim 1 wherein the noisemaker is initially activated from a point below the animal.

3. Apparatus for capturing animals in chimneys comprising (a) a portable electrically-operated noisemaker, (b) a portable electical power source therefor, (c) means for lowering said noisemaker into the chimney, (d) means for remotely activating the noisemaker from the top of the chimney, and (e) a cage having a downwardly-oriented opening adapted to be mounted on the chimney for capturing said animal that is frightened from said chimney by said noisemaker.

4. Apparatus of claim 3 wherein the cage has a sliding door for the downwardly-oriented opening.

5. Apparatus of claim 3 including a viewing device for observing the inside of the chimney from the side of the cage.

6. Apparatus of claim 3 including a wheel on the side of the cage for lowering the noisemaking device on its electrical cord.

7. Apparatus of claim 3 wherein the noisemaker is a siren.

* * * * *